United States Patent [19]

Sinenci

[11] 4,146,201

[45] Mar. 27, 1979

[54] PARACHUTE INSPECTION ARCH

[75] Inventor: Francis P. Sinenci, Hana, Hi.

[73] Assignee: The United States of America as represented by the Secretary of the Air Force, Washington, D.C.

[21] Appl. No.: 852,112

[22] Filed: Nov. 16, 1977

[51] Int. Cl.$^2$ .............................................. B64D 21/00
[52] U.S. Cl. ..................................... 244/142; D7/196; 135/3 R; 211/1; 272/1 R; 272/113; 272/56; D21/245
[58] Field of Search ............... 244/142, 148, 121, 147, 244/118 R, 1 R; 272/113, 115, 56, 1 R; D34/5 D, 5 H; 135/3 R; D7/196; 211/1

[56] References Cited

U.S. PATENT DOCUMENTS

| | | | |
|---|---|---|---|
| 1,441,940 | 1/1923 | Nafe | D34/5 D |
| 2,768,828 | 10/1956 | Pack | 272/113 |
| 3,261,605 | 7/1966 | Smith | D34/5 D |
| 3,480,023 | 11/1969 | McConnell et al. | 135/3 R |
| 3,544,125 | 12/1970 | Unno | 272/56 |

FOREIGN PATENT DOCUMENTS 2308722 9/1974 Fed. Rep. of Germany ........... 244/121

OTHER PUBLICATIONS

Irving Air Chute Co., Canopy Test, Jan. 25, 1944, (2 photographs).

Primary Examiner—Galen L. Barefoot
Attorney, Agent, or Firm—Joseph E. Rusz; Arsen Tashjian

[57] ABSTRACT

An inspection aid for use in the visual inspection, repair and repacking of parachutes including a pair of large opposed spaced side frame members of light tubular material having a shape approaching that of a cardioid. The frame members are parallel to each other and joined by a series of spaced transverse cross members which serve to maintain the shape and rigidity of the arch. In use, the parachute canopy is billowed open with a pedestal fan and the arch is carried into the open canopy and turned to the side. A person can then enter the open parachute and visually examine the canopy fabric and make required repairs after which the parachute is folded and reefed. The remaining gores are inspected and folded, the inspection arch is removed and the reefing is completed in the usual manner.

3 Claims, 1 Drawing Figure

U.S. Patent  Mar. 27, 1979  4,146,201
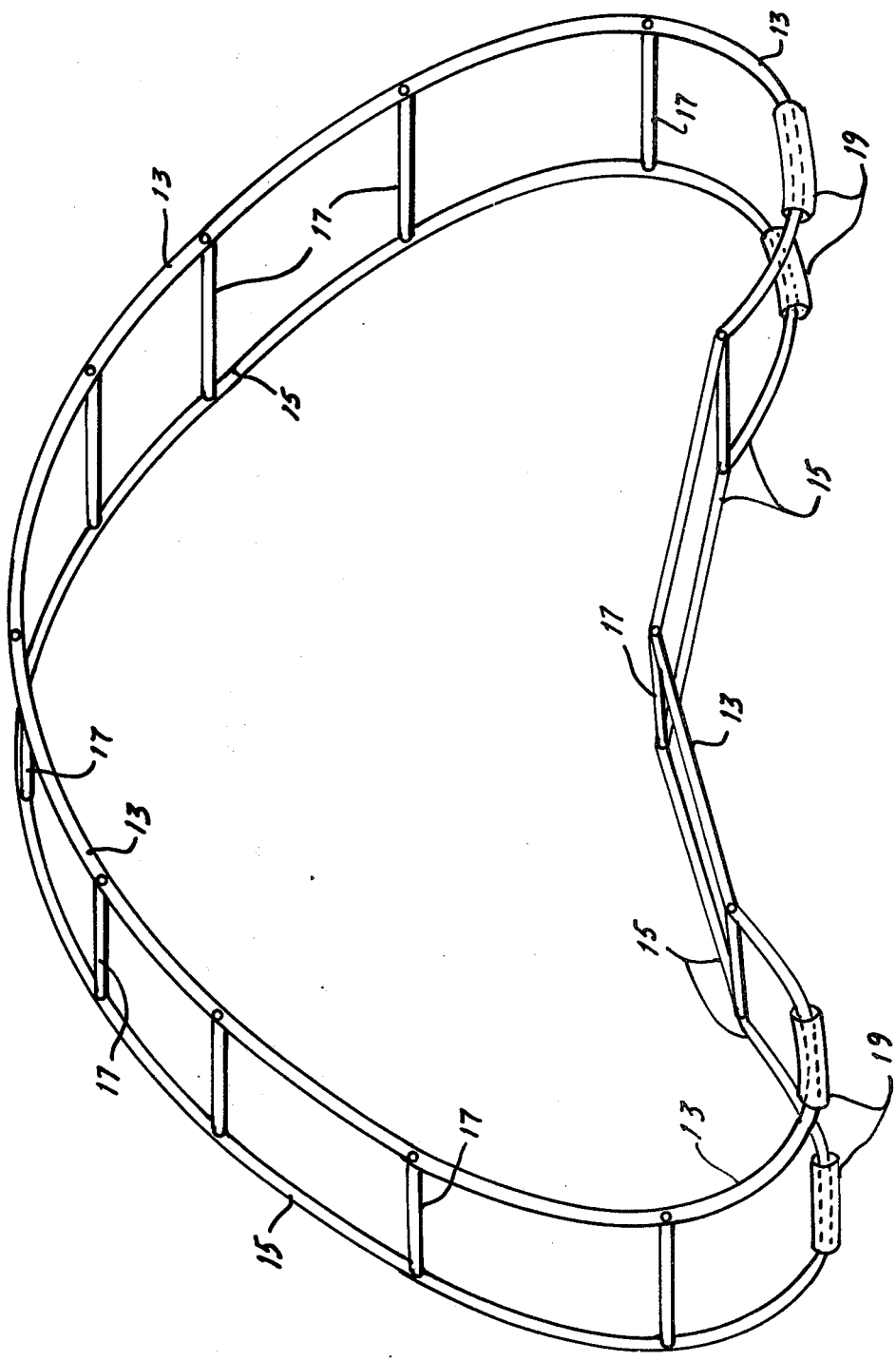

PARACHUTE INSPECTION ARCH

STATEMENT OF GOVERNMENT INTEREST

The invention described herein may be manufactured and used by or for the Government for governmental purposes without the payment of any royalty thereon.

BACKGROUND OF THE INVENTION

This invention relates to a parachute inspection aid structure and, more particularly, the invention is concerned with providing an arch shaped frame which can be placed inside an open parachute allowing a person to step inside and inspect and repair the canopy where necessary. The frame also serves to simplify the folding and reefing of the parachute after inspection.

The present method of inspecting, airing and folding of G-11A and G-12D cargo parachutes is tedious and requires a good deal of physical dexterity. Visual inspection of the canopies requires two men on the G-12D chute and three men on the G-11A chute. Small holes in the canopies are difficult to detect while inspecting by the conventional method because of the layers of fabric under the section being inspected. If a hole is detected, one man must enter the canopy and make the repairs with an adhesive nylon patch provided the holes are within the limits allowed.

After the inspection phase on the G-11A, the canopy is billowed using a pedestal fan. The canopy is then reefed and folded using one or two man to hold the skirt while another man routes the reefing line through the reefing line loops. Thus it can be seen that the inspection of the 100 foot diameter G-11A parachute is a tedious operation requiring considerable physical exertion because the canopy must be held open and folded or the lines have to be retained by the necks of the individuals in order to retain line group separation.

The hereinafter described invention overcomes the aforementioned disadvantages by enabling the parachute riggers to make a more thorough inspection while making the long folds. Fewer men are required to handle the parachute during the inspection procedure. Complete preparation for the repacking of the G-11, G-12 and drone aircraft recovery parachutes can be accomplished with greater ease and speed.

SUMMARY OF THE INVENTION

The present invention is concerned with providing a parachute inspection arch for use in the visual inspection, repair and repacking of large cargo parachutes. A pair of large opposed spaced side frame members in the shape of a cardioid are formed of light tubular material such as aluminum or plastic. The frame members are held parallel to one another by a series of spaced transverse cross members maintaining the shape and rigidity of the arch. The arch is carried into the open canopy which is billowed open by a pedestal fan and then turned to the side. The open parachute can then be entered and examined visually for tears and small holes. After the required repairs are made, the parachute can be foled and reefed and the arch removed so that the reefing can be completed in the usual manner.

Accordingly, it is an object of the invention to provide a parachute inspection and folding arch which will enable parachute riggers to make a more thorough inspection of the chute while making the long folds therein.

Another object of the invention is to provide a parachute inspection aid which can be used to prepare the parachutes for machine sewing and/or making repairs using adhesive nylon.

Still another object of the invention is to provide a parachute inspection aid which can be manufactured out of any suitable lightweight tubular metal or plastic that will maintain a specific shape when inserted into a parachute which has been billowed open by a pedestal floor fan.

A further object of the invention is provide a parachute inspection and folding arch having a shape approaching that of a cardioid with a series of spaced transverse cross members disposed between a pair of parallel frame members. The lowermost portion of the frame, where it comes in contact with the floor is covered with plastic to prevent possible damage to the parachute canopy.

A still further object of the invention is to provide a parachute inspection aid which allows inspection, repair and replacing of the suspension lines as well as checking line sequence in an easier and faster manner with fewer men and with less chance of error.

These and other objects features and advantages will become more apparent after considering the following detailed description taken in conjunction with the annexed drawing and appended claims.

BRIEF DESCRIPTION OF THE DRAWING

The FIGURE is a view in perspective of a parachute inspection and folding arch according to the invention showing the substantially cardioid shape of the side frame members with the transverse cross members therebetween and the plastic covering over the lowermost portion of the frames.

DESCRIPTION OF A PREFERRED EMBODIMENT

Referring now to the drawing, there is shown the cargo chute inspection and folding arch in the completely assembled condition. The arch includes two identical parallel frame members 13 and 15 which are substantially cardioid in shape and constructed of a lightweight tubular material such as aluminum or plastic. A series of transverse cross members 17 and 15 serving to maintain the shape and rigidity of the arch. The lowermost portions of each of the frame members 13 and 15 are covered with plastic boots 19 to prevent possible damage to the parachute canopy during insertion of the arch therein and removal therefrom.

In use, the arch which stands approximately 10 feet high and 10 feet long by 3 feet wide is constructed of lightweight tubing. The height should be within reach of the average person. All rough edges should be smoothed by sanding to prevent snagging of the parachute during use.

To prepare the G-11A or G-12 cargo parachutes to receive the parachute inspection aid, the reference lines plus four adjacent lines are inserted into a line retainer (not shown) which is single slotted and includes a high end and a removable low end. The high end stops and guides oncoming lines to the retainer slot and the low end of removable in order to make it easier to remove the retainer without disturbing the lines. The use of the parachute inspection aid enables folds to be made continuously in one direction, hence only a single slot line retainer is required.

After certain of the lines are inserted into the line retainer, other lines are placed over the top of the inspection arch which is placed in front of the parachute. A pedestal fan is placed about 10 feet from the canopy pointing at the partially opened skirt. The parachute inspection arch is then carried and slipped into the open canopy with the lines still over the top. The arch is then rotated to the side to facilitate folding and reefing.

Spot drying of canopies can be accomplished in this manner. Small holes and tears can be easily seen from the inside of the canopy using existing overhead lights. Holes within the scope of repairing with adhesive nylon patch can easily be made. Cutting and basting for machine sewing is simplified using the inspection arch. After the inspection procedure is completed, the reefing line is inserted through the rings while folding action is provided by pulling the canopy, causing it to fall into long folds with the lines falling into the retainer. The right line group is tied when the line 61 cutter is reefed. After reefing cutter on line 61, folding is continued in the same direction. The remaining gores are inspected and the parachute inspection aid is removed when all of the loose gores are folded. The remaining gores are folded and reefed and, after apex inspection, the reefing is complete and the left and right gores are separated and tied.

Although the invention has been illustrated in the accompanying drawing and described in the foregoing specification in terms of a preferred embodiment thereof, the invention is not limited to this embodiment or to the preferred configuration shown. It will be apparent to those skilled in the art that my invention could have extensive use in other operations where it is necessary to prepare parachutes for repack such as drone aircraft recovery parachutes, space capsule recovery parachutes or any large chutes used in aerial delivery facilities.

Having thus set forth the nature of my invention, what I claim and desire to secure by Letters Patent of the United States is:

1. A parachute inspection and folding arch for holding a large cargo carrying parachute in the billowed open position during operations thereon, said parachute arch comprising a pair of identical opposed spaced side frame members of substantially cardioid shape, and a plurality of spaced transverse cross members fixedly positioned between said frame members for maintaining the shape and rigidity thereof, said transverse cross members holding said pair of frame members in parallel relationship one to the other thereby allowing said inspection arch to be inserted into an open parachute and turned to the side to facilitate the inspection, repair and repacking thereof.

2. The parachute inspection and folding arch defined in claim 1 wherein said pair of spaced side frame members are fabricated of a light tubular material to allow said frames to be formed into the substantially cardioid shape.

3. The parachute inspection and folding arch defined in claim 2 wherein a plastic boot is affixed to the lowermost portion of each side of each frame member to prevent possible damage to the parachute during insertion and removal of the arch.

* * * * *